United States Patent [19]
Curran et al.

[11] Patent Number: 5,806,046
[45] Date of Patent: Sep. 8, 1998

[54] METHOD AND APPARATUS FOR SELECTING A VEHICLE SEAT AND OBTAINING USER INFORMATION

[75] Inventors: Jeffrey A. Curran, Waterford; James Edward Mitchell, Lake Orion; Earl Clyde Lucas, Jr., Auburn Hills; Richard Lane Rakes, Jr., Dearborn; Andrea M. Paquin, Saline, all of Mich.

[73] Assignee: Lear Corporation, Southfield, Mich.

[21] Appl. No.: 606,580

[22] Filed: Feb. 26, 1996

[51] Int. Cl.⁶ ................................................. G06F 17/60
[52] U.S. Cl. .................................................... 705/27
[58] Field of Search ........................... 705/26, 27, 28, 705/29

[56] References Cited

U.S. PATENT DOCUMENTS

| | | | |
|---|---|---|---|
| 3,757,037 | 9/1973 | Bialek | 705/27 |
| 4,992,940 | 2/1991 | Dowrkin | 705/26 |
| 5,515,268 | 5/1996 | Yoda | 705/26 |
| 5,550,746 | 8/1996 | Jacobs | 705/27 |
| 5,615,342 | 3/1997 | Johnson | 705/27 |

OTHER PUBLICATIONS

Sawers, Seattle–area dealers hawk their wares via computer, Automotive News, p. 12i, Oct. 31, 1994.

Johnson, Using PCs and Windows NT to sell Rover cars, PC User, p. 35(1), Jun. 29, 1994.

*Primary Examiner*—Kevin J. Teska
*Assistant Examiner*—Matthew Clay Loppnow
*Attorney, Agent, or Firm*—MacMillan, Sobanski & Todd, LLC

[57] ABSTRACT

An apparatus (10) for selecting a vehicle seat and obtaining user information includes a CPU (11) connected to an input device (12), a monitor (13), a speaker (14) and a memory (15). A method of operating the apparatus (10) includes storing a plurality of vehicle interior photographs in the memory (15), generating screens on the monitor (13) and audio on the speaker (14) requesting user related information be entered utilizing the input device (12), utilizing the user entered information to select a vehicle having the seat best suited for the user, displaying the stored photograph of the selected vehicle interior on the monitor (13) and storing the user entered information in the memory (15).

20 Claims, 13 Drawing Sheets

METHOD AND APPARATUS FOR SELECTING A VEHICLE SEAT AND OBTAINING USER INFORMATION

BACKGROUND OF THE INVENTION

The present invention relates generally to an apparatus and method for assisting a person in choosing a vehicle having a seat best suited for him or her.

When choosing a vehicle, the seats are just one of many items to be considered from the standpoint of comfort. Today, vehicle manufacturers are specifying seats which take into account the physical characteristics of the driver and passengers as well as the physical characteristics of the seats to match the personality of the vehicle. Current seats vary in lumbar support, cushion bolster size, back bolster size and firmness. The buyer has little information about which vehicles of the type he or she prefers have seats which best match his or her physical characteristics and seating construction preferences.

SUMMARY OF THE INVENTION

The present invention concerns an apparatus for selecting a vehicle seat and obtaining user information. The apparatus includes a computer means having an input device input, a video output, an audio output and an input/output port; an input device such as a mouse connected to said input device input for entering user information; a monitor connected to said video output for displaying screens; a speaker connected to said speaker output; and a memory connected to said input/output port, said memory having a plurality of representations of vehicle interiors stored therein. The computer means executes an application program for generating a plurality of screens on the monitor requesting user information, the computer means being responsive to information entered by a user for selecting a vehicle having a seat best suited for the user and causing an associated one of the representations to be displayed on the monitor. The computer means stores the information entered by the user in the memory which information can be utilized for marketing studies.

The method for selecting a vehicle seat and obtaining user information comprises the steps of: storing a plurality of representations seats in vehicle interiors; generating a plurality of screen displays on a monitor requesting information about a user; selecting a vehicle having a seat best suited to the user based upon information provided by the user in response to the requests in the screen displays; and displaying a one of the stored representations associated with the selected vehicle. The method also includes a step of generating audio instructions requesting information about the user and a step of storing information provided by the user.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
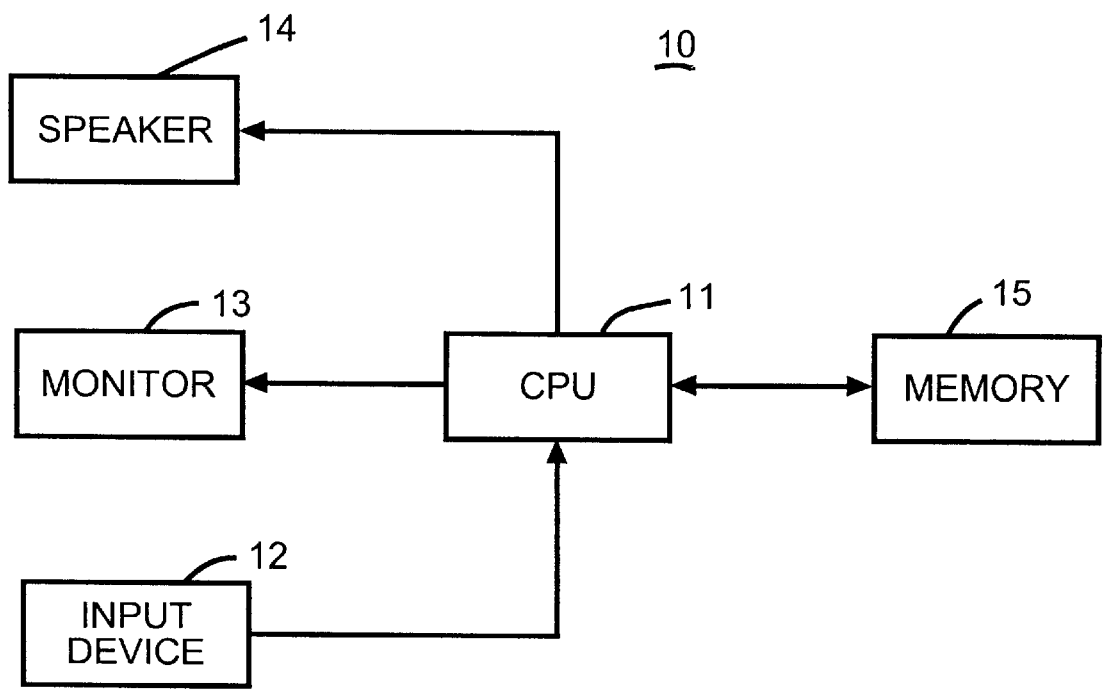
FIG. 1 is a schematic block diagram of an apparatus for selecting a vehicle seat and obtaining user information in accordance with the present invention.

There is shown in the FIG. 1 an apparatus in accordance with the present invention in the form of a computer system 10. The system 10 includes a central processing unit (CPU) 11 which should preferably have 16MB of random access memory (RAM) and be running a Microsoft® Windows™ 3.11 or Windows 95™ operating system. An input device 12, such as a mouse, has an output connected to an input of the CPU 11. A video signal output of the CPU 11 is connected to an input of a monitor 13 which has at least 640 Bits×480 Lines resolution for displaying 64K colors. The CPU 11 also has at least a 16 bit sound card for generating an audio signal at an audio output connected to an input of a speaker 14. An input/output port of the CPU 11 is connected to an input/output port of a memory 15 which can be a hard drive for storing the operating system software and an application program for performing the method according to the present invention. The application program requires a database program such as the Borland database engine and a video program such as Windows for Video.

Figure 2:
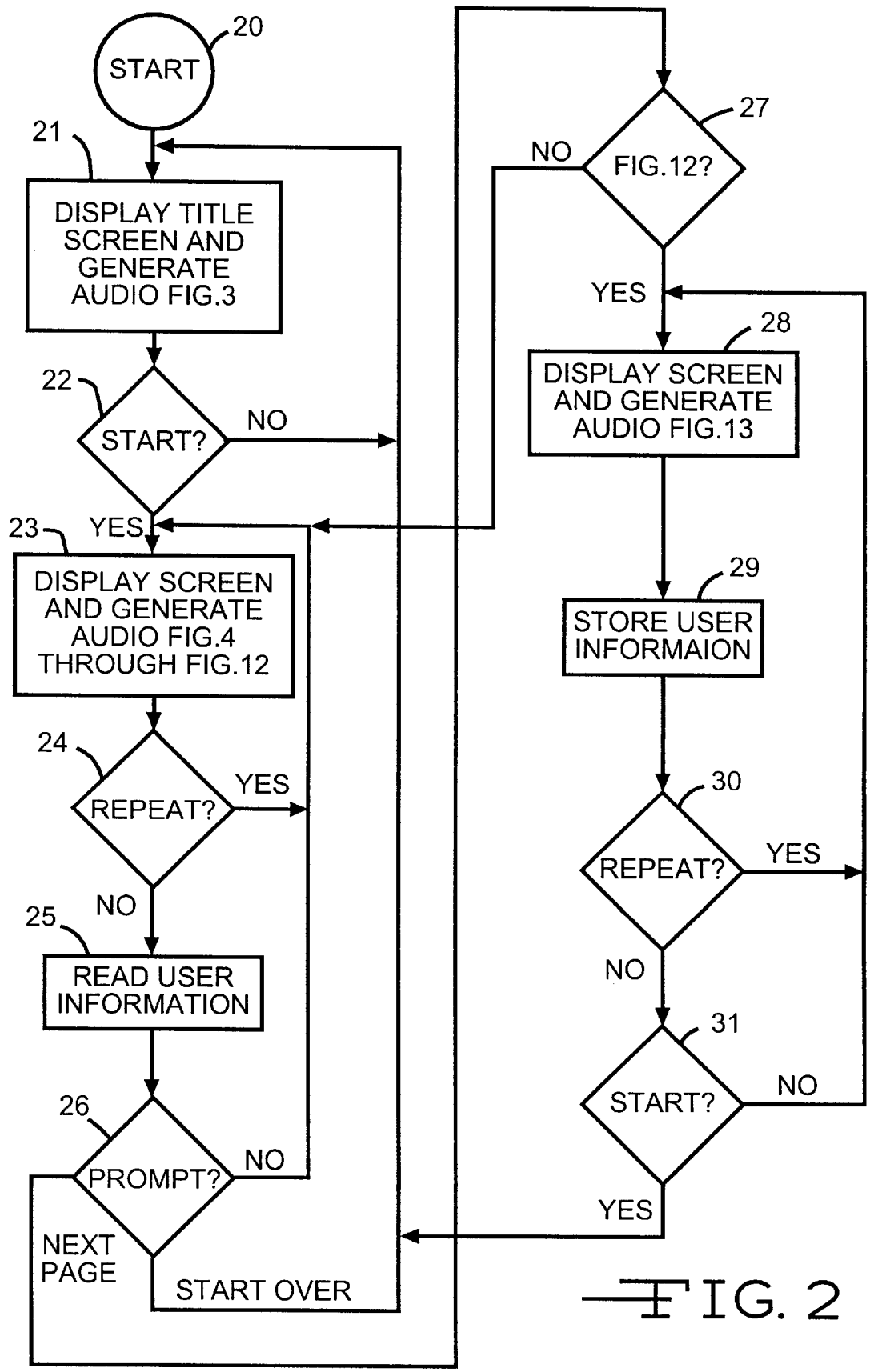
FIG. 2 is a flow diagram of a method of operation of the apparatus shown in the FIG. 1.

There is shown in the FIG. 2 a flow diagram of the method according to the present invention which method can be implemented as a software program. First the sequence of steps of the method will be described and then each screen generated during the execution of the method steps will be described in more detail. The CPU 11 generates a plurality of screen displays on the monitor 13 in sequence with associated audio messages generated from the speaker 14. Each screen display between the title screen and the last screen prompts the user to input an instruction utilizing the input device 12 to return to the title screen, to repeat the audio message or to switch to the next screen display.

Figure 3:
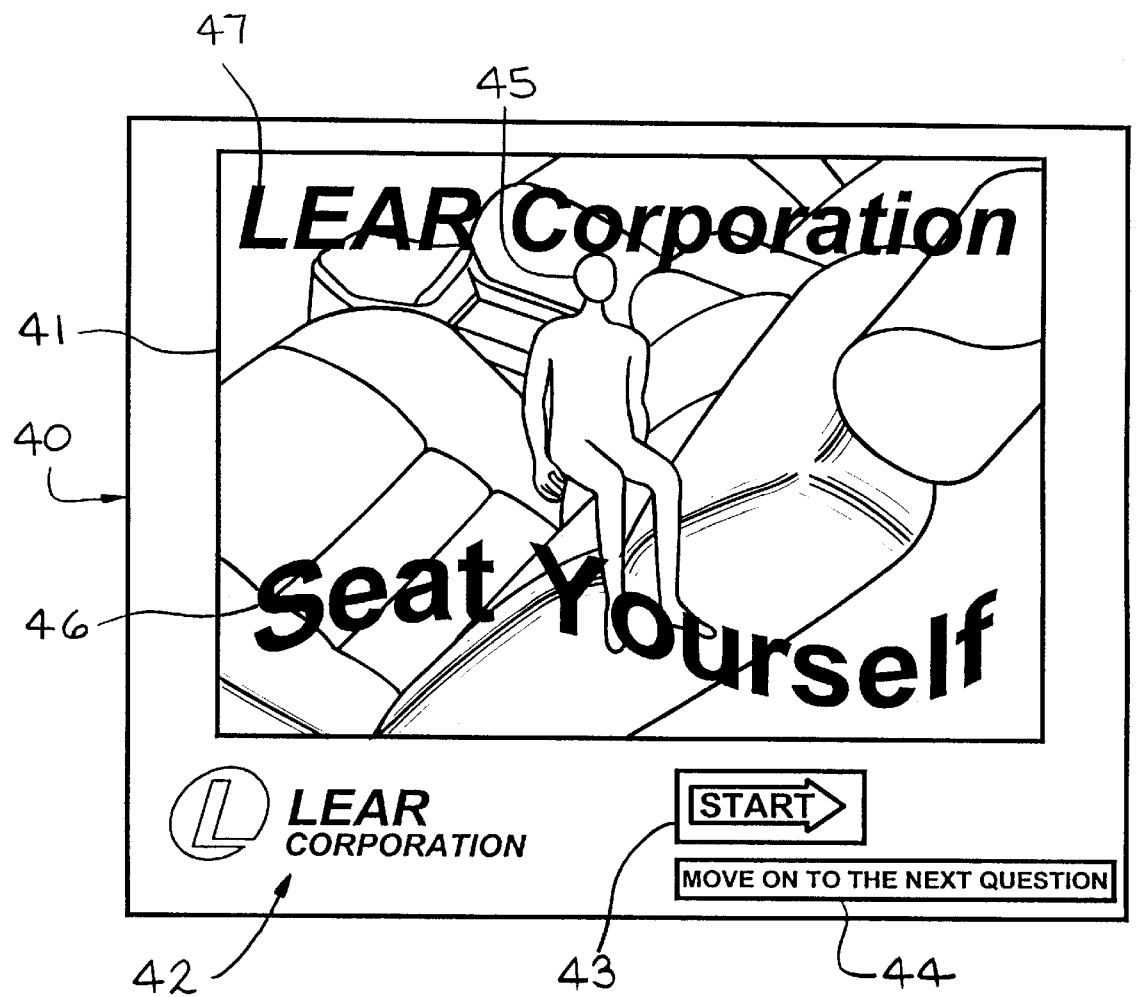
FIG. 3 is a title screen generated by the apparatus shown in the FIG. 1.

The programmed method begins at a circle 20 "START" and enters an instruction set 21 "DISPLAY TITLE SCREEN AND GENERATE AUDIO FIG. 3" which displays a title screen (see the FIG. 3) and generates an associated audio message. The audio message welcomes the user and includes background music. The program then enters a decision point 22 "START?" to check for an input from a user to start the sequence of screens. If no input is detected, the program branches at "NO" back to the instruction set 21. When an input is detected, the program branches at "YES" to an instruction set 23 "DISPLAY SCREEN AND GEN- ERATE AUDIO FIG. 4 THROUGH FIG. 12". The program displays the next screen in sequence (see the FIG. 4) and generates an associated audio message. As discussed below, each of these screens solicits the user to input information through use of the input device 12. The program then enters a decision point 24 "REPEAT?" to check for an input from the user requesting a repeat of the audio message associated with the screen. If an input is detected, the program branches at "YES" back to the instruction set 23 to continue the display of the screen and regenerate the associated audio message. When no input is detected, the program branches at "NO" to an instruction set 25 "READ USER INFORMATION" wherein the CPU 11 reads the information entered by the user. The program then enters a decision point 26 "PROMPT?" to detect an instruction from the user.

When no prompt input is detected, the program branches at "NO" back to the instruction set 23. When the user has decided to return to the beginning of the program, the program branches at "START OVER" back to the instruction set 21. When the user has decided to go to the next screen, the program branches at "NEXT PAGE" to a decision point 27 "FIG. 12?". In the decision point 27, the program determines whether the screen currently displayed is the screen shown in the FIG. 12. If not, the program branches at "NO" back to the instruction set 23 to generate the next screen in the sequence of screens shown in the FIG. 4 through the FIG. 12. If the screen being displayed is the one shown in the FIG. 12, the program branches at "YES" to an instruction set 28 "DISPLAY SCREEN AND GENERATE AUDIO FIG. 13". The screen shown in the FIG. 13 includes an interior view of the vehicle having the seats which best match the information entered by the user in the screens shown in the FIG. 4 through the FIG. 12. Since the program has now gathered all of the information input by the user, the program enters an instruction set 29 "STORE USER INFORMATION" wherein such information is stored in the memory in database form for later use. The program then enters a decision point 30 "REPEAT?" to check for an input from the user requesting a repeat of the audio message associated with the screen. If an input is detected, the program branches at "YES" back to the instruction set 28 to continue the display of the screen and regenerate the associated audio message. When no input is detected, the program branches at "NO" to a decision point 31 "START?" to detect an instruction from the user. If no input is detected, the program branches at "NO" back to the instruction set 28. If an input is detected, the program branches at "YES" back to the instruction set 21. At any point in the program, if no inputs have been sensed for a predetermined time period, the program automatically returns to the instruction set 21.

There is shown in the FIG. 3 a first or title screen 40 generated by the instruction set 21 of the program shown in the FIG. 2 on the monitor 13 shown in the FIG. 1. The screen 40 includes a generally rectangular graphic display area 41 with a company identification display area 42 positioned below a lower left corner thereof and a "START" command button 43 positioned below a lower right corner thereof. An instruction box 44 is shown positioned below the button 43 and is only displayed when a pointer (not shown) controlled by the mouse is adjacent the button. The box 44 contains text which explains the operation of the button 43 to the user. The CPU 11, under the control of the application software, generates a reproduction of a photograph of an interior of a vehicle showing a pair of front bucket type seats as a background in the display area 41. In a central foreground of the display area 41, the CPU 11 generates a representation of a dummy 45 of the type used to simulate a human for sizing and testing vehicle interior components. The dummy 45 rotates about a generally vertical axis at a predetermined speed. Associated with the dummy is a title 46 "Seat Yourself" for the program which title twists about and changes size as the dummy rotates. A company name 47 enters the display area 41 at the lower edge thereof as a string of letters and flows to the position shown along the upper edge of the display. The instruction set 21 generates an audio message, such as a greeting and brief explanation of the program with background music, and can generate any other desired text or graphics also. When the user clicks on the command button 43 with the mouse 12, the program branches from the decision point 22 in the FIG. 2 to the instruction set 23 to display the screen shown in the FIG. 4.

Figure 4:
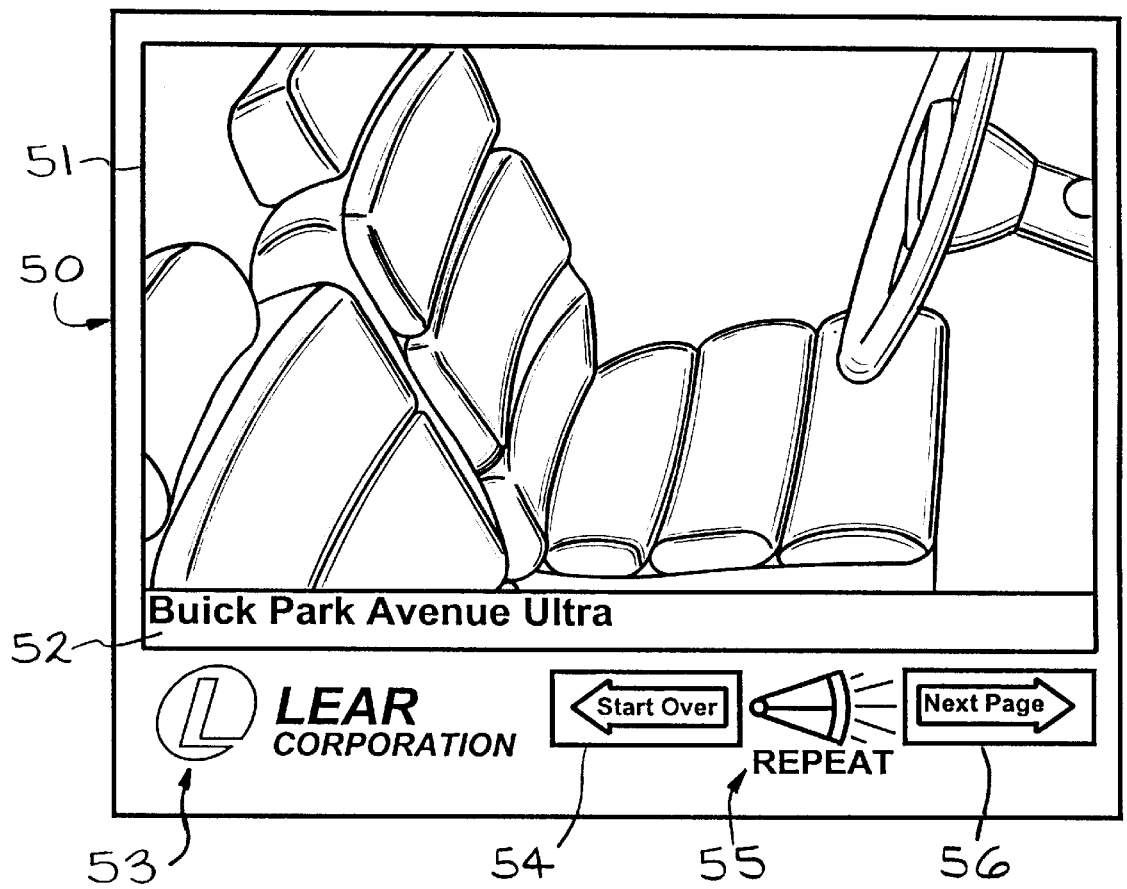
FIG. 4 is a vehicle interior presentation screen generated by the apparatus shown in the FIG. 1.

There is shown in the FIG. 4 a vehicle interior presentation screen 50 generated by the instruction set 23 of the program shown in the FIG. 2 on the monitor 13 shown in the FIG. 1. The screen 50 includes a generally rectangular graphic display area 51 having a vehicle identification band 52 positioned along a lower edge thereof. Positioned below the band 52 from left to right is a company identification display area 53, a "Start Over" command button 54, a "REPEAT" command button 55 and a "Next Page" command button 56. The CPU 11, under the control of the application software, generates a reproduction of a photograph of an interior of a vehicle showing a front seat or seats in the display area 51 and text identifying the make and model of the vehicle in the band 52. The CPU 11 updates the display area 51 and the band 52 in a predetermined timed sequence to display all of a plurality of photographs of vehicle interiors stored in the memory 15. The instruction set 23 generates an audio message, such as a brief explanation of the operation and result of the program. If the user selects the command button 54, the program exits the decision point 26 and returns to the instruction set 21 and the display shown in the FIG. 3. If the user selects the command button 55, the program exits the decision point 24 and repeats the associated audio message. If the user selects the command button 56, the program exits the decision point 26 and enters the instruction set 21 and the display shown in the FIG. 5.

Figure 5:
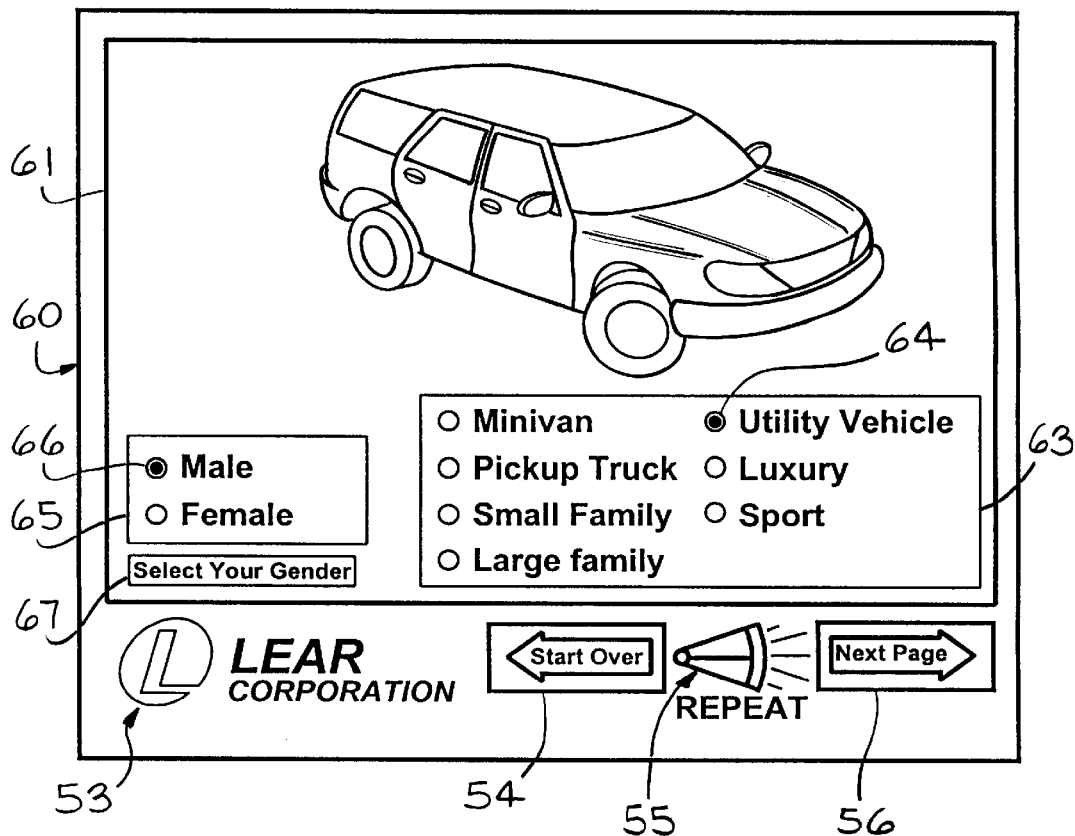
FIG. 5 is a user gender and vehicle type information screen generated by the apparatus shown in the FIG. 1.

There is shown in the FIG. 5 a user gender and vehicle type information screen 60 generated by the instruction set 23 of the program shown in the FIG. 2 on the monitor 13 shown in the FIG. 1. The screen 60 includes a generally rectangular graphic display area 61 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a reproduction of a graphic rendering 62 of a vehicle in the upper portion of the display area 61. A vehicle type box 63 is positioned in a lower right portion of the area 61 and contains a plurality of vehicle type option buttons with associated text identifying the type of vehicle to be selected by the user. Only one option button can be in the selected condition at any time. When one of the option buttons is selected, such as the option button 64 associated with the text "Utility Vehicle" as shown, the CPU 11 updates the graphic rendering 62 in the display area 61 to display the type of vehicle selected. A user gender box 65 is positioned in a lower left portion of the display 61 and contains a pair of option buttons for selecting "Male" or "Female" with the "Male" option button 66 being shown as selected. An instruction box 67 is shown positioned below the user gender box 65 and is only displayed when a pointer (not shown) controlled by the mouse is adjacent the user gender box. Similar instruction boxes (not shown) are generated adjacent the vehicle type box 63 and the command buttons 54, 55 and 56. In addition, the CPU 11 generates an audio message requesting that user gender and vehicle type information be entered.

Figure 6:
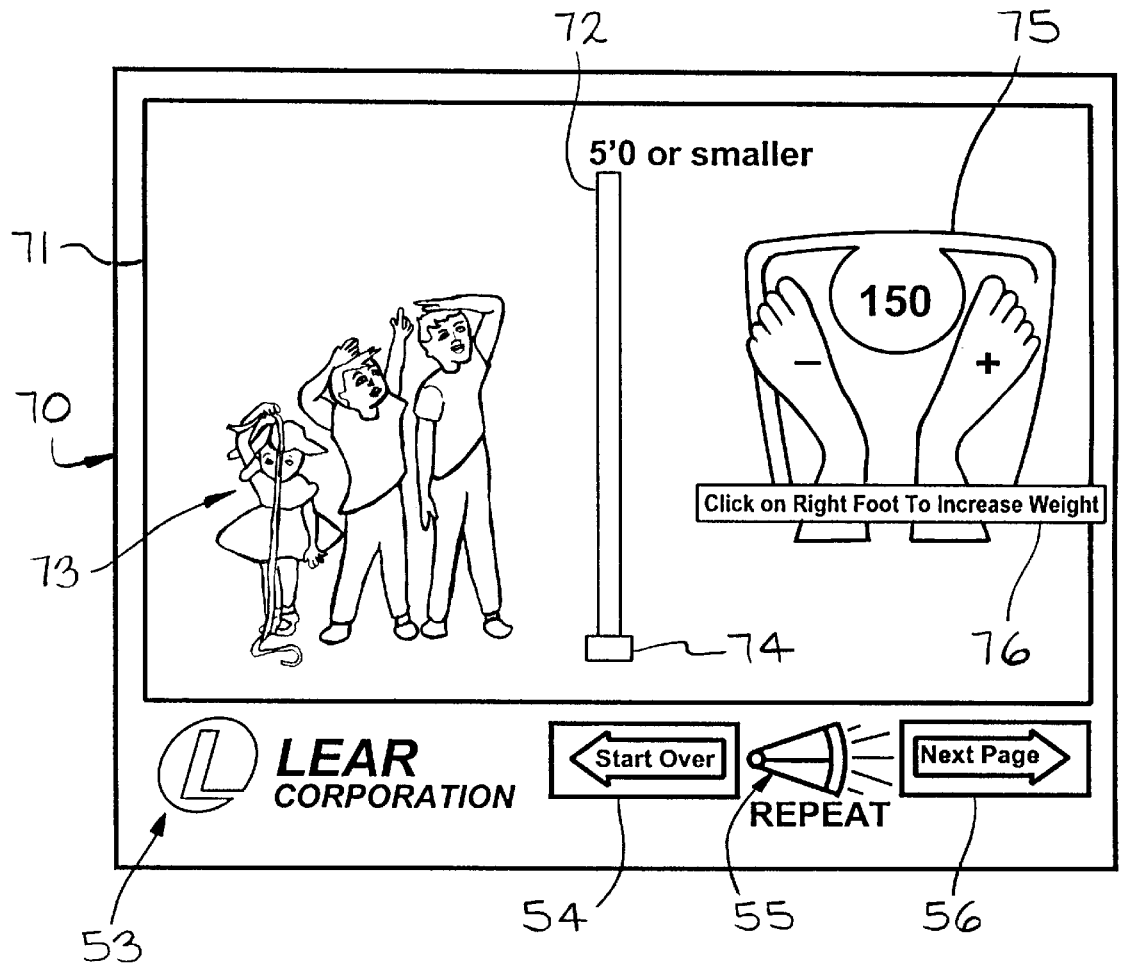
FIG. 6 is a user height and weight information screen generated by the apparatus shown in the FIG. 1.

There is shown in the FIG. 6 a user height and weight information screen 70 generated by the instruction set 23 of the program shown in the FIG. 2 when the command button 56 shown in the FIG. 5 is selected by the user. The screen 70 includes a generally rectangular graphic display area 71 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a generally vertically extending slot 72 with an associated graphic representation 73 of children measuring height in a left portion thereof. A slider knob 74 can be moved up and down the slot 72 by clicking and dragging to indicate the height of the user the value of which is displayed in text at the top of the slot. In a right portion of the display area 71 there is generated a graphic representation of a bathroom scale 75 with a pair of human feet and a pounds display. By clicking on a plus sign on the right foot, the pounds display can be increased and by clicking on a minus sign on the left foot, the pounds display can be decreased. An instruction box 76 is shown positioned below the right foot and is only displayed when a pointer (not shown) controlled by the mouse is adjacent the plus sign. Similar instruction boxes (not shown) are generated adjacent the minus sign, the slider 72 and the command buttons 54, 55 and 56. The CPU 11 generates a voice explaining the operation of the slider knob 74 and the bathroom scale 75.

Figure 7:
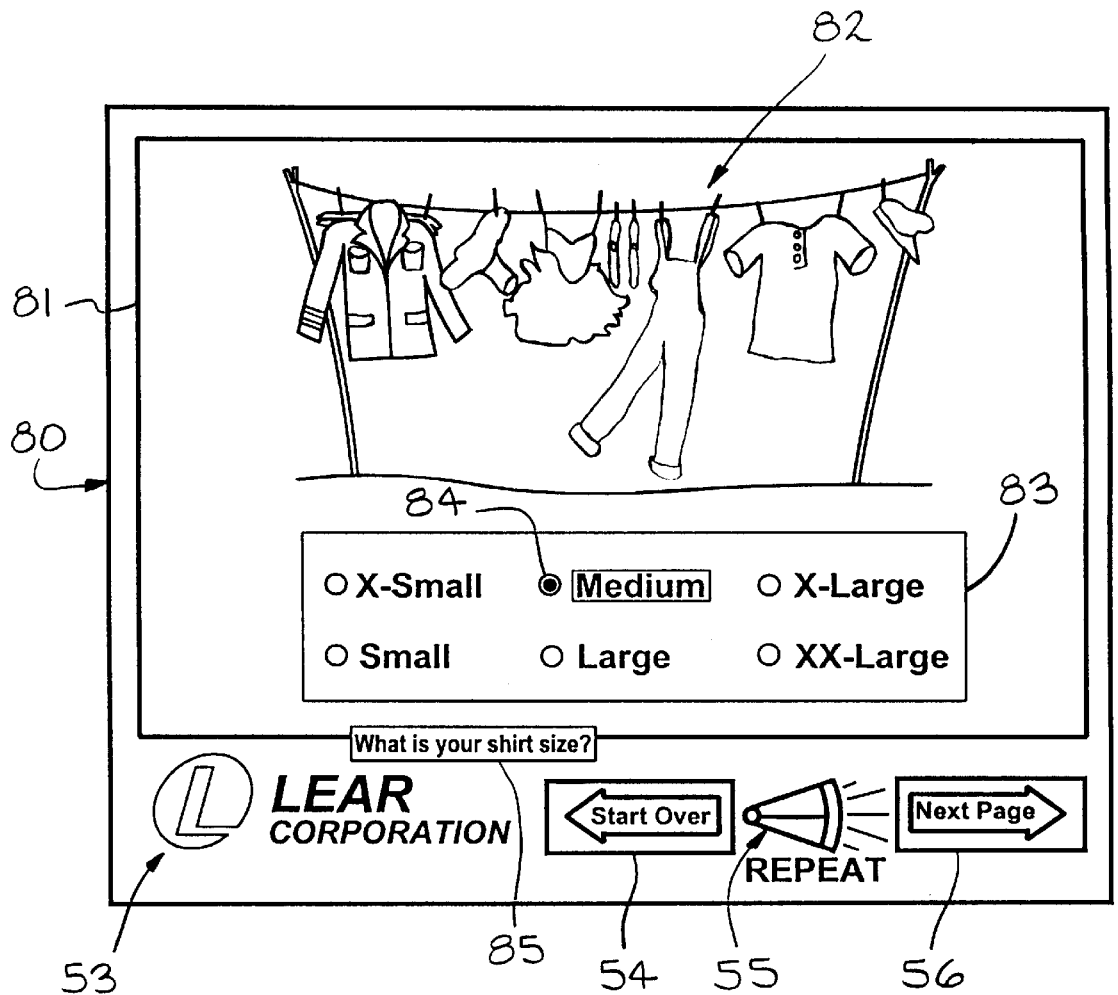
FIG. 7 is a male user shirt size information screen generated by the apparatus shown in the FIG. 1.

There is shown in the FIG. 7 a male user shirt size information screen 80 generated by the instruction set 23 of the program shown in the FIG. 2 when the command button 66 shown in the FIG. 5 and the command button 56 shown in the FIG. 6 are selected by the user. The screen 80 includes a generally rectangular graphic display area 81 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 82 of clothing hung on a washline in an upper portion thereof. Below the representation 82 is a shirt size option button box 83 having a plurality of shirt size option buttons and associated text such as the "Medium" option button 84 shown as selected. An instruction box 85 is shown positioned below the shirt size box 83 and is only displayed when a pointer (not shown) controlled by the mouse is adjacent the box. Similar instruction boxes (not shown) are generated adjacent the command buttons 54, 55 and 56. The CPU 11 generates a voice requesting the entry of information.

Figure 8:
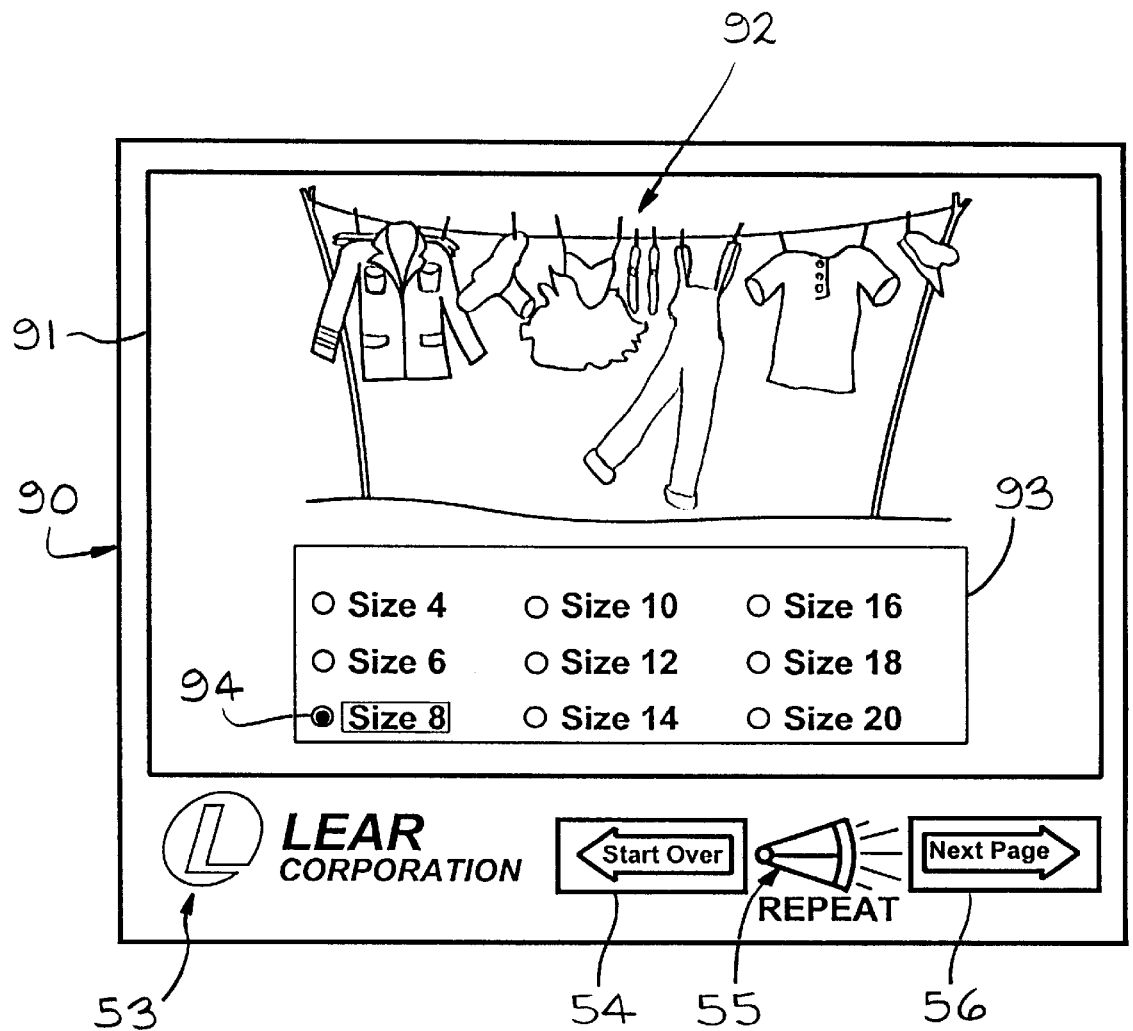
FIG. 8 is a female user dress size information screen generated by the apparatus shown in the FIG. 1.

There is shown in the FIG. 8 a female user dress size information screen 90 generated by the instruction set 23 of the program shown in the FIG. 2 when the "Female" command button shown in the FIG. 5 and the command button 56 shown in the FIG. 6 are selected by the user. The screen 90 includes a generally rectangular graphic display area 91 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 92 of clothing hung on a washline in an upper portion thereof. Below the representation 92 is a dress size option button box 93 having a plurality of dress size option buttons and associated text such as the "Size 8" option button 94 shown as selected. Instruction boxes (not shown) are generated adjacent the box 93 and the command buttons 54, 55 and 56. The CPU 11 generates a voice requesting the entry of information.

Figure 9:
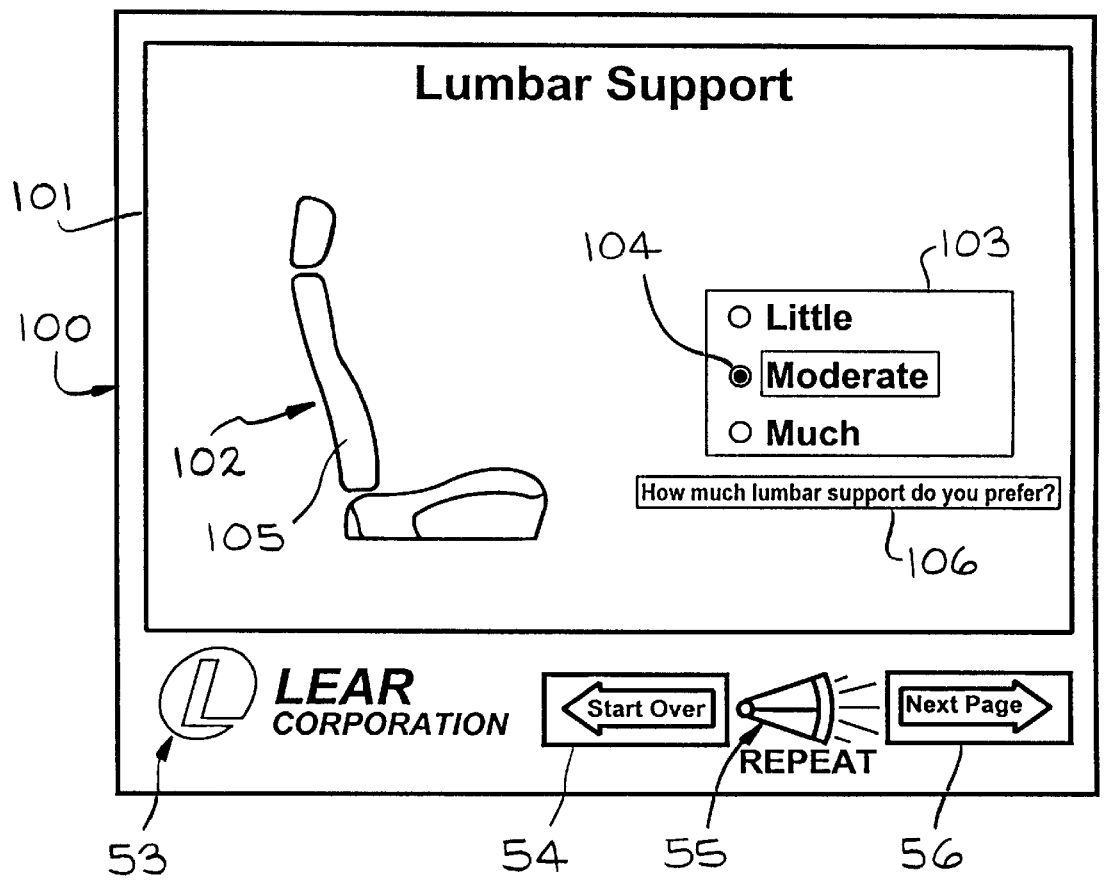
FIG. 9 is a lumbar support information screen generated by the apparatus shown in the FIG. 1.

There is shown in the FIG. 9 a lumbar support information screen 100 generated by the instruction set 23 of the program shown in the FIG. 2 when the command button 56 shown in the FIG. 7 or the FIG. 8 is selected by the user. The screen 100 includes a generally rectangular graphic display area 101 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 102 of a vehicle seat in a left portion thereof. To the right of the representation 102 is a lumbar support option button box 103 having a plurality of lumbar support option buttons and associated text such as the "Moderate" option button 104 shown as selected. Selection of one of the option buttons in the box 103 causes a thickness change in a lumbar area 105 of the representation 102. An instruction box 105 is shown positioned below the lumbar support box 103 and is only displayed when a pointer (not shown) controlled by the mouse is adjacent the box. Similar instruction boxes (not shown) are generated adjacent the command buttons 54, 55 and 56. The CPU 11 generates a voice explaining lumbar support and requesting the entry of information.

Figure 10:
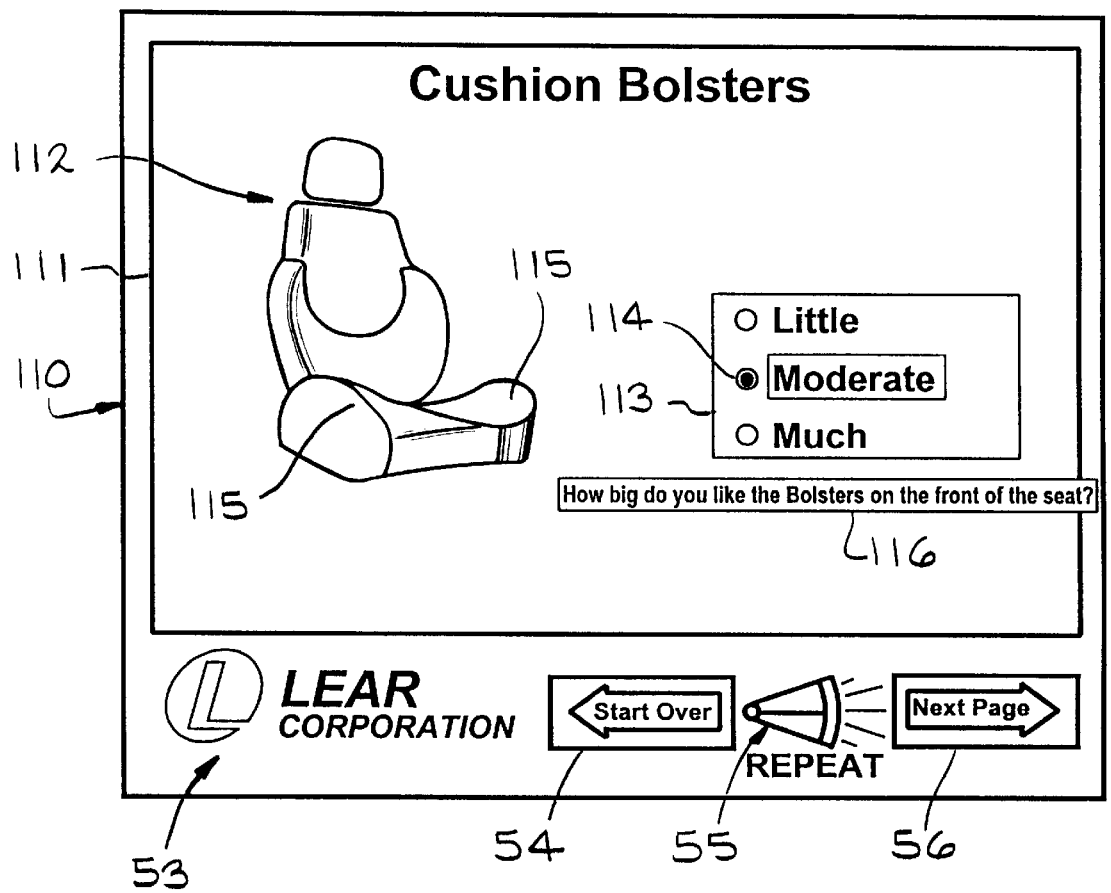
FIG. 10 is a cushion bolster information screen generated by the apparatus shown in the FIG. 1.

There is shown in the FIG. 10 a cushion bolster information screen 110 generated by the instruction set 23 of the program shown in the FIG. 2 when the command button 56 shown in the FIG. 9 is selected by the user. The screen 110 includes a generally rectangular graphic display area 111 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 112 of a vehicle seat in a left portion thereof. To the right of the representation 112 is a cushion bolster option button box 113 having a plurality of cushion bolster option buttons and associated text such as the "Moderate" option button 114 shown as selected. Selection of one of the option buttons in the box 113 causes a thickness change in a cushion bolster 115 on either side of the cushion portion of the seat representation 112. An instruction box 116 is shown positioned below the box 113 and is only displayed when a pointer (not shown) controlled by the mouse is adjacent the box. Similar instruction boxes (not shown) are generated adjacent the command buttons 54, 55 and 56. The CPU 11 generates a voice explaining cushion bolsters and requesting the entry of information.

Figure 11:
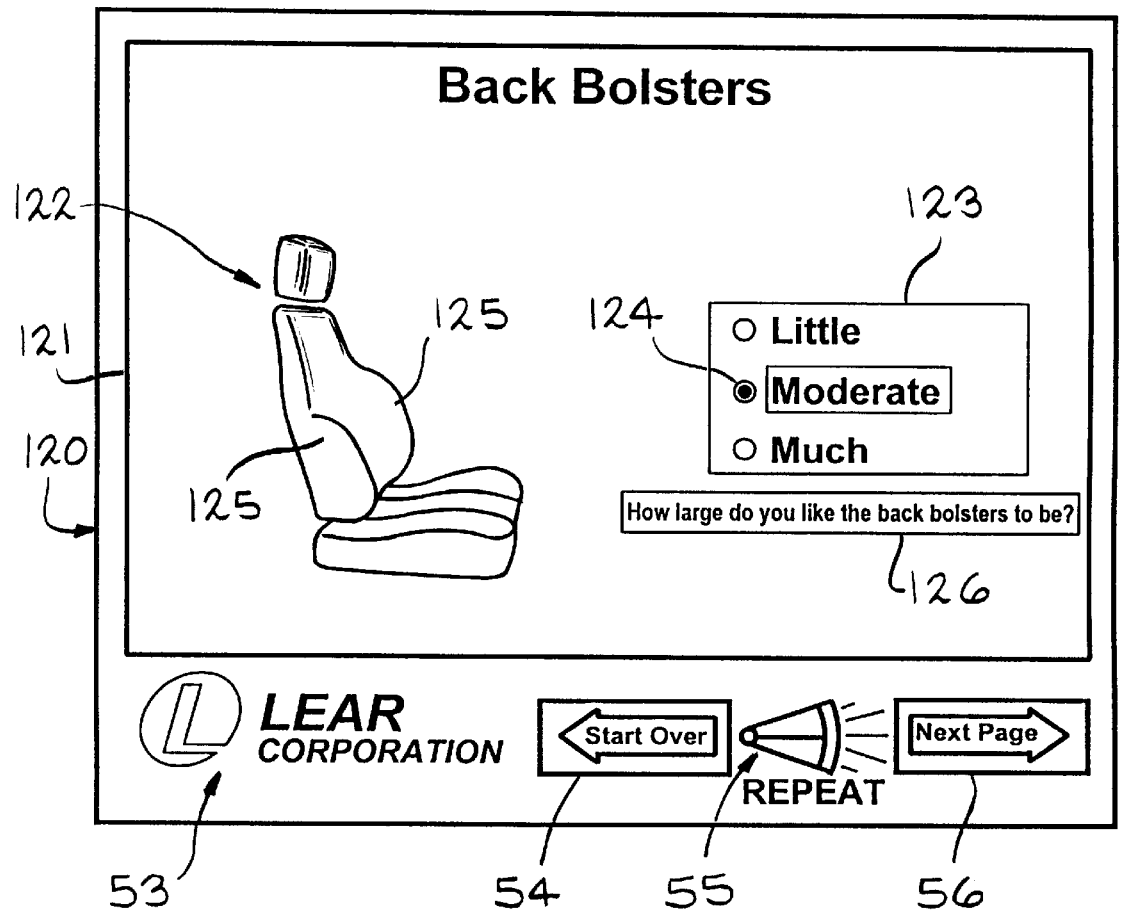
FIG. 11 is a back bolster information screen generated by the apparatus shown in the FIG. 1.

There is shown in the FIG. 11 a back bolster information screen 120 generated by the instruction set 23 of the program shown in the FIG. 2 when the command button 56 shown in the FIG. 10 is selected by the user. The screen 120 includes a generally rectangular graphic display area 121 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 122 of a vehicle seat in a left portion thereof. To the right of the representation 122 is a back bolster option button box 123 having a plurality of back bolster option buttons and associated text such as the "Moderate" option button 124 shown as selected. Selection of one of the option buttons in the box 123 causes a thickness change in a back bolster 125 on either side of the back portion of the seat representation 122. An instruction box 126 is shown positioned below the box 123 and is only displayed when a pointer (not shown) controlled by the mouse is adjacent the box. Similar instruction boxes (not shown) are generated adjacent the command buttons 54, 55 and 56. The CPU 11 generates a voice explaining back bolsters and requesting the entry of information.

Figure 12:
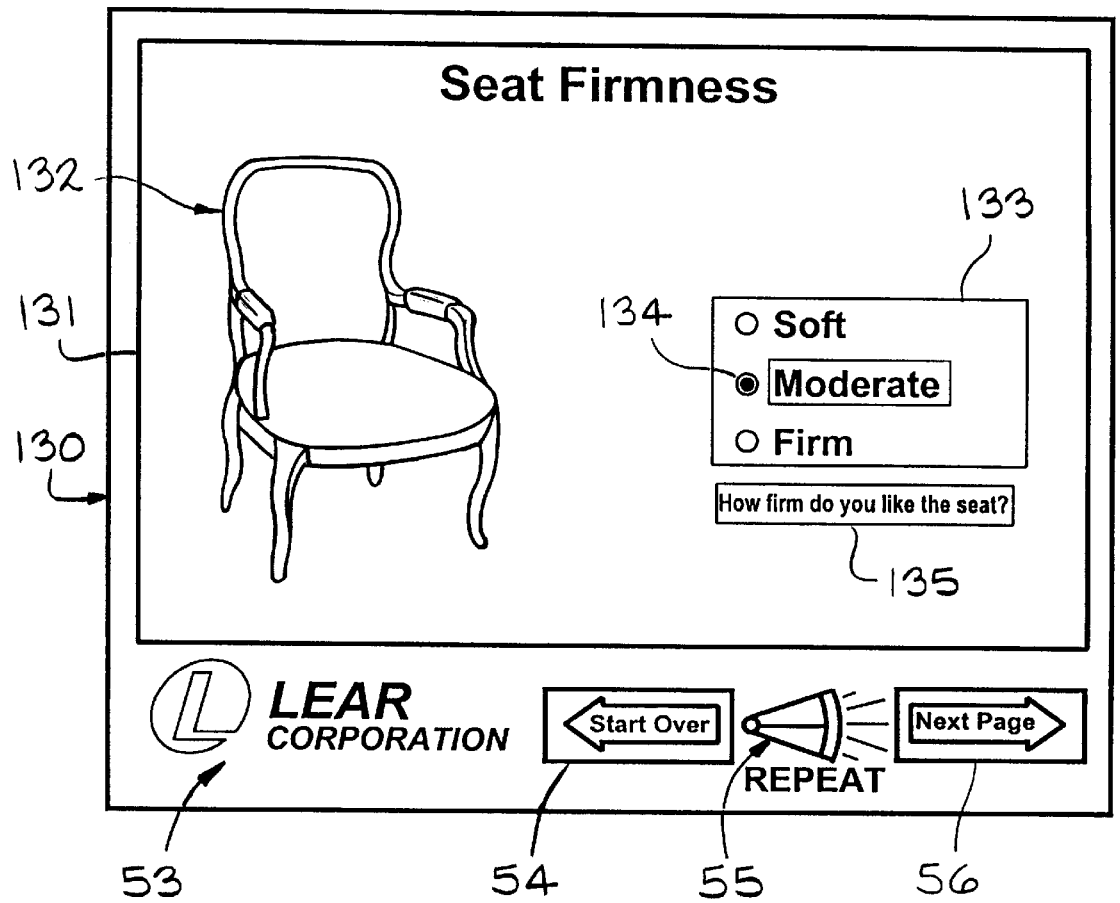
FIG. 12 is a seat firmness information screen generated by the apparatus shown in the FIG. 1.

There is shown in the FIG. 12 a seat firmness information screen 130 generated by the instruction set 23 of the program shown in the FIG. 2 when the command button 56 shown in the FIG. 11 is selected by the user. The screen 130 includes a generally rectangular graphic display area 131 and positioned along a lower edge thereof, from left to right, are the company identification display area 53, the "Start Over" command button 54, the "REPEAT" command button 55 and the "Next Page" command button 56 from the FIG. 4. The CPU 11, under the control of the application software, generates a graphic representation 132 of a chair in a left portion thereof. To the right of the representation 132 is a seat firmness option button box 133 having a plurality of seat firmness option buttons and associated text such as the "Moderate" option button 134 shown as selected. Selection of one of the option buttons in the box 133 causes a change in graphic representation 132. An instruction box 135 is shown positioned below the box 133 and is only displayed when a pointer (not shown) controlled by the mouse is adjacent the box. Similar instruction boxes (not shown) are generated adjacent the command buttons 54, 55 and 56. The CPU 11 generates a voice explaining seat firmness and requesting the entry of information.

Figure 13:
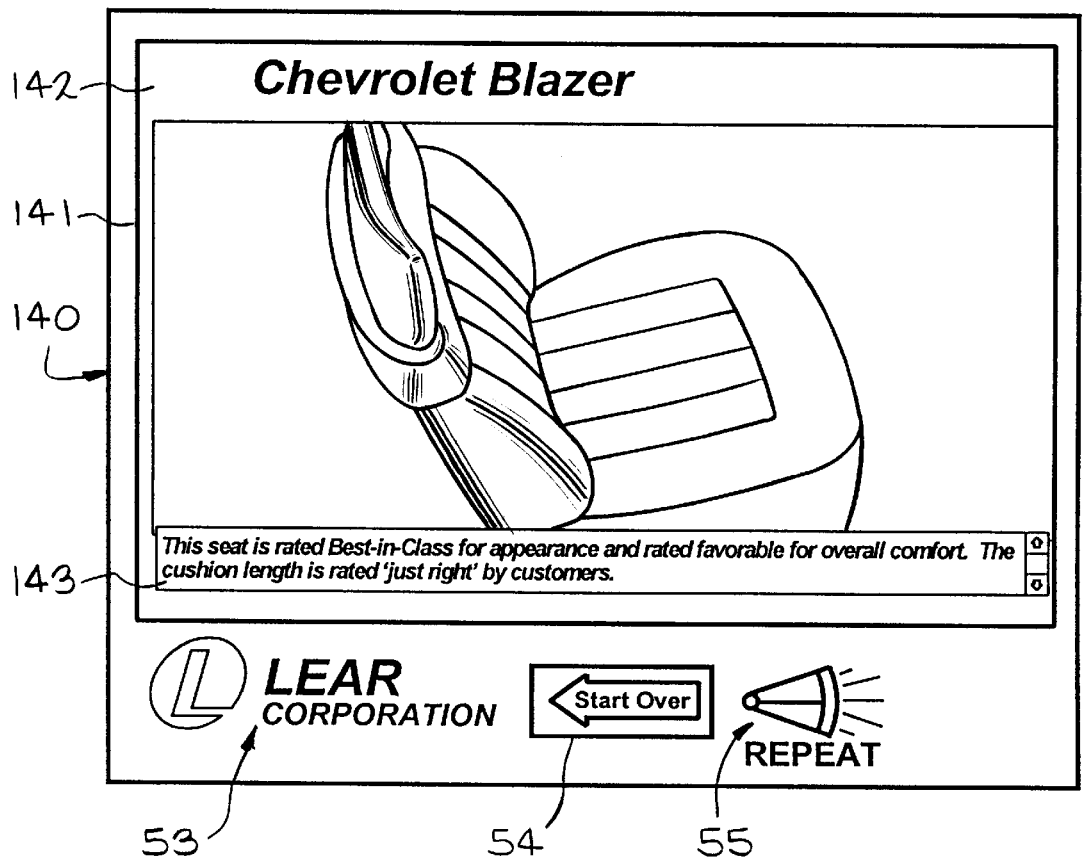
FIG. 13 is a selected vehicle make and model presentation screen generated by the apparatus shown in the FIG. 1.

There is shown in the FIG. 13 a selected vehicle make and model presentation screen 140 generated by the instruction set 23 of the program shown in the FIG. 2 on the monitor 13 shown in the FIG. 1 when the command button 56 shown in the FIG. 12 is selected by the user. The screen 140 is similar to the screen 50 shown in the FIG. 4 and includes a generally rectangular graphic display area 141 having a vehicle identification band 142 positioned along an upper edge thereof and a text band 143 positioned along a lower edge thereof. Positioned below the band 143 from left to right is the company identification display area 53, the "Start Over" command button 54 and the "REPEAT" command button 55. The CPU 11, under the control of the application software, generates a reproduction of a photograph of an interior of a vehicle showing a pair of front bucket type seats in the display area 141, text identifying the make and model of the vehicle in the band 142 and text explaining the selection in the band 143. The CPU 11 determines which stored photograph to display based upon the information provided by the user selections in the screens of the FIG. 5 through the FIG. 12. The instruction set 23 generates an audio message, such as a brief explanation of the selected photograph.

The information provided by the user is stored in the memory 15 in database format so that it can be utilized as a marketing tool. The information requested in the screens of the FIG. 5 through the FIG. 8 includes information related to human physical characteristics of the user and the computer can convert the human physical characteristic information into numerical values. The information requested in the screens of the FIG. 9 through the FIG. 12 includes information related to seat physical characteristics preferred by the user and the computer can converting the seat physical characteristic information into numerical values. The computer can combine the numerical values to obtain a sum and compare the sum against numerical values stored in the memory and associated with the vehicles for which said representations are stored.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for selecting a vehicle seat and obtaining user information comprising:

a computer means having an input device input, a video output, an audio output and an input/output port;

an input device connected to said input device input for entering user information, said user information including at least one human physical characteristic of the user and at least one seat physical characteristic preferred by the user;

a monitor connected to said video output for displaying screens;

a speaker connected to said speaker output; and a memory connected to said input/output port, said memory having a plurality of representations of vehicle interiors stored therein whereby said computer means executes an application program for generating a plurality of screens on said monitor requesting said user information, said computer means being responsive to said user information entered by a user for selecting a vehicle having a seat best suited for the user and causing an associated one of said representations to be displayed on said monitor.

2. The apparatus according to claim 1 wherein said computer means stores said information entered by the user in said memory.

3. The apparatus according to claim 1 wherein said plurality of screens includes a user gender and vehicle type information screen requesting information on the gender of the user and the type of vehicle preferred by the user.

4. The apparatus according to claim 1 wherein said plurality of screens includes a user height and weight information screen requesting information as to the height and weight of the user.

5. The apparatus according to claim 1 wherein said plurality of screens includes a shirt size information screen requesting information as to a shirt size of a male user.

6. The apparatus according to claim 1 wherein said plurality of screens includes a dress size information screen requesting information as to a dress size of a female user.

7. The apparatus according to claim 1 wherein said plurality of screens includes a lumbar support information screen requesting information as to the lumbar support preferred by the user.

8. The apparatus according to claim 1 wherein said plurality of screens includes a cushion bolster information screen requesting information as to the cushion bolster preferred by the user.

9. The apparatus according to claim 1 wherein said plurality of screens includes a back bolster information screen requesting information as to the back bolster preferred by the user.

10. The apparatus according to claim 1 wherein said plurality of screens includes a seat firmness information screen requesting information as to the sear firmness preferred by the user.

11. The apparatus according to claim 1 wherein said input device is a mouse for clicking on designated areas on said screens for entering said user information.

12. The apparatus according to claim 1 wherein said computer means generates audio instructions through said speaker during display of at least one of said screens on said monitor.

13. A method for selecting a vehicle seat and obtaining user information comprising the steps of:
   a. storing a plurality of representations seats in vehicle interiors;
   b. generating a plurality of screen displays on a monitor requesting information about a user, said user information including at least one human physical characteristic of the user and at least one seat physical characteristic preferred by the user;
   c. selecting a vehicle having a seat best suited to the user based upon said user information provided by the user in response to the requests in the screen displays; and
   d. displaying a one of the stored representations associated with the selected vehicle.

14. The method according to claim 13 wherein the step b. includes generating audio instructions requesting information about the user.

15. The method according to claim 13 including a step of storing information provided by the user.

16. The method according to claim 13 wherein the information requested in the step b. includes information related to human physical characteristics of the user and the step c. includes converting said human physical characteristic information into numerical values.

17. The method according to claim 16 wherein the information requested in the step b. includes information related to seat physical characteristics preferred by the user and the step c. includes converting said seat physical characteristic information into numerical values.

18. The method according to claim 17 including a step of combining said numerical values to obtain a sum and the step c. includes comparing said sum against numerical values associated with the vehicles for which said representations are stored.

19. An apparatus for selecting a vehicle seat and obtaining user information for use in marketing vehicle seats comprising:
   a computer means having an input device input, a video output, an audio output and an input/output port;
   an input device connected to said input device input for entering user information, said user information including at least one human physical characteristic of the user and at least one seat physical characteristic preferred by the user;
   a monitor connected to said video output for displaying screens;
   a speaker connected to said speaker output; and
   a memory connected to said input/output port, said memory having a plurality of representations of vehicle interiors stored therein whereby said computer means executes an application program for generating a plurality of screens on said monitor requesting said user information, said computer means being responsive to said user information entered by a user for selecting a vehicle having a seat best suited for the user and causing an associated one of said representations to be displayed on said monitor, said computer storing said user information for each user in said memory in a database format sufficient for later use as a marketing tool for the vehicle seats.

20. The apparatus according to claim 19 wherein said input device includes a mouse and said screens include option buttons for actuation by clicking said mouse.

* * * * *